United States Patent
Szor et al.

(10) Patent No.: US 10,204,223 B2
(45) Date of Patent: Feb. 12, 2019

(54) SYSTEM AND METHOD TO MITIGATE MALICIOUS CALLS

(71) Applicant: McAfee, LLC, Santa Clara, CA (US)

(72) Inventors: Peter Szor, Huntington Beach, CA (US); Rachit Mathur, Hilsboro, OR (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 15/708,003

(22) Filed: Sep. 18, 2017

(65) Prior Publication Data

US 2018/0004951 A1 Jan. 4, 2018

Related U.S. Application Data

(63) Continuation of application No. 14/318,242, filed on Jun. 27, 2014, now Pat. No. 9,767,283.

(51) Int. Cl.
 *G06F 21/56* (2013.01)
(52) U.S. Cl.
 CPC .................. *G06F 21/566* (2013.01)
(58) Field of Classification Search
 CPC ......... G06F 21/50; G06F 21/51; G06F 21/566
 USPC .......................................................... 726/23
 See application file for complete search history.

(56) References Cited

U.S. PATENT DOCUMENTS

| | | | |
|---|---|---|---|
| 5,719,942 A | 2/1998 | Aldred et al. | |
| 5,987,610 A | 11/1999 | Franczek et al. | |
| 6,073,142 A | 6/2000 | Geiger et al. | |
| 6,460,050 B1 | 10/2002 | Pace et al. | |
| 7,369,539 B1 | 5/2008 | Christie | |
| 7,437,759 B1* | 10/2008 | Szor ...................... | G06F 21/52 713/164 |
| 7,506,155 B1 | 3/2009 | Stewart et al. | |
| 7,552,477 B1 | 6/2009 | Satish et al. | |
| 8,353,033 B1* | 1/2013 | Chen ....................... | G06F 21/51 713/164 |

(Continued)

FOREIGN PATENT DOCUMENTS

| | | |
|---|---|---|
| JP | 4572259 B | 11/2010 |
| KR | 10-20080047231 | 5/2008 |
| WO | 2015199874 A1 | 12/2015 |

OTHER PUBLICATIONS

KR Oct. 24, 2017 Notice of Preliminary Rejection from Korean Application KR2016-7-32680 (14 pages).

(Continued)

*Primary Examiner* — Dant B Shaifer Harriman
(74) *Attorney, Agent, or Firm* — Patent Capital Group (57) ABSTRACT

Systems and methods are provided in example embodiments for mitigating malicious calls. The system can be configured to receive a function call, determine the location of a memory page that initiated the function call, determine if the memory page is associated with a trusted module, and block the function call if the memory page is not associated with the trusted module. In addition, the system can determine the return address for the function call and block the function call if the return address does not belong to the trusted module. Further, the system can determine a parameter for the function call, determine if the parameter is a known parameter used by the process that called the function, and block the function call if the parameter is not the known parameter used by the process that called the function.

17 Claims, 8 Drawing Sheets

(56) References Cited

U.S. PATENT DOCUMENTS

| | | | |
|---|---|---|---|
| 8,752,048 B1* | 6/2014 | Backensto | G06F 11/1479 714/13 |
| 8,850,408 B2 | 9/2014 | Hinkle | |
| 9,424,427 B1* | 8/2016 | Chiriac | G06F 21/566 |
| 9,767,283 B2 | 9/2017 | Szor et al. | |
| 2005/0044292 A1 | 2/2005 | McKeen | |
| 2005/0144471 A1 | 6/2005 | Shupak et al. | |
| 2011/0138476 A1 | 6/2011 | Black et al. | |
| 2011/0277035 A1 | 11/2011 | Singh et al. | |
| 2014/0033314 A1 | 1/2014 | Wibbeler | |
| 2015/0121073 A1 | 4/2015 | Wajs | |
| 2015/0213260 A1 | 7/2015 | Park | |
| 2015/0379267 A1 | 12/2015 | Szor et al. | |

OTHER PUBLICATIONS

EP Nov. 6, 2017 Extended European Search Report and Written Opinion for European Application 15812272.1 (6 pages).
PCT—Aug. 27, 2015 International Search Report and Written Opinion in International Application No. PCT/US2015/032593, dated Aug. 27, 2015, 12 pages.
JP Jan. 4, 2018 Office Action in JP Application No. 2016-567935 dated Jan. 4, 2018 (4 pages) with English translation (9 pages).
KIPO Apr. 26, 2018 Notice of Allowance from Korean Application No. 10-2016-7032680 with English Translation; 3 pages.

* cited by examiner

SYSTEM AND METHOD TO MITIGATE MALICIOUS CALLS

This application is a continuation (and claims the benefit of priority under 35 U.S.C. § 120) of U.S. patent application Ser. No. 14/318,242, filed Jun. 27, 2014, entitled "SYSTEM AND METHOD TO MITIGATE MALICIOUS CALLS". The disclosure of the prior application is considered part of and is hereby incorporated by reference in its entirety in the disclosure of this application.

TECHNICAL FIELD

This disclosure relates in general to the field of information security, and more particularly, to the mitigation of malicious calls.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Example Embodiments

Figure 1:
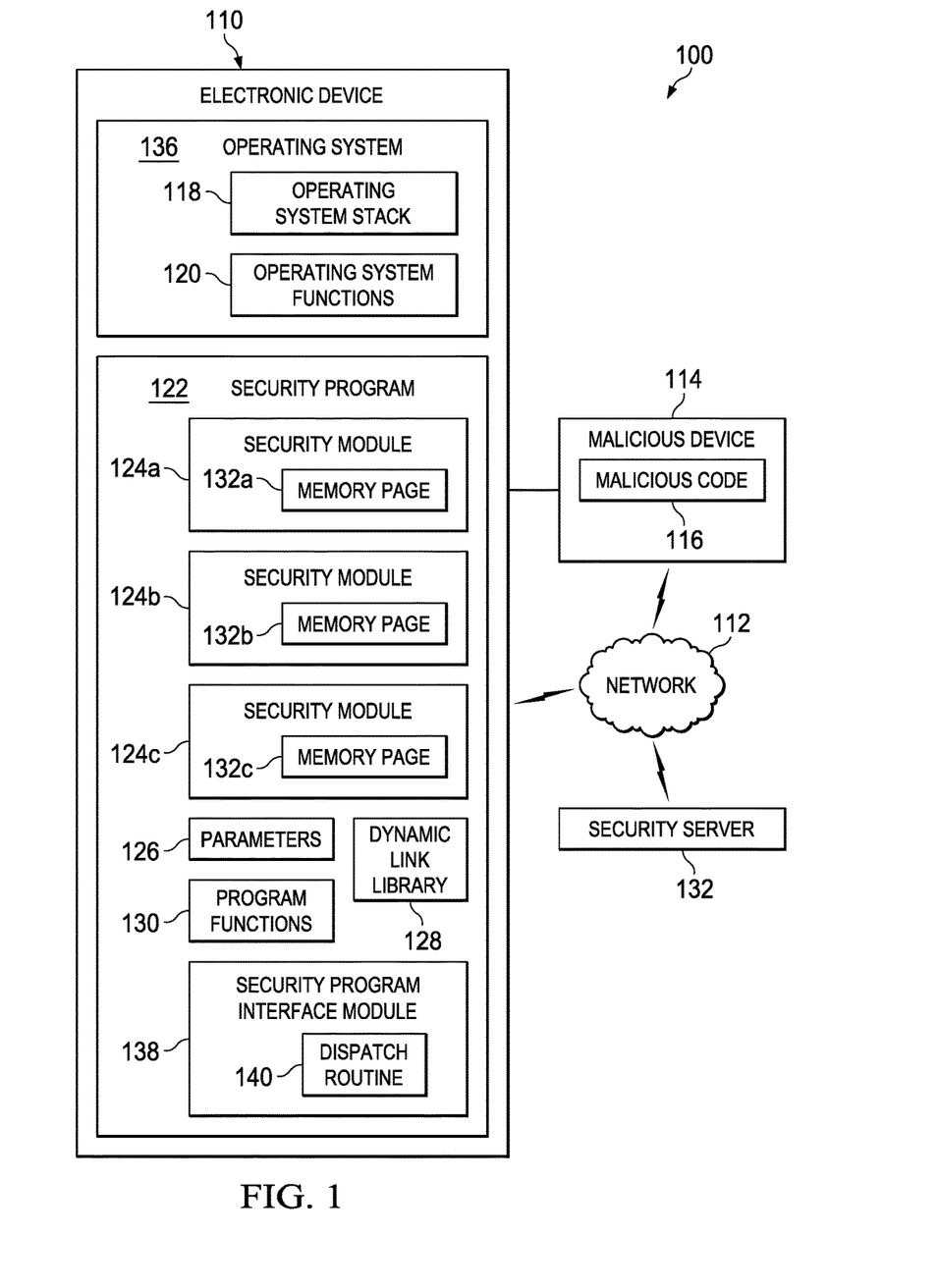
FIG. 1 is a simplified block diagram of a communication system for mitigating malicious calls in accordance with an embodiment of the present disclosure.

FIG. 1 is a simplified block diagram of a communication system 100 to mitigate against malicious calls. Communication system 100 can include an electronic device 110, a network 112, and a security server 132. Electronic device 110 can include a security program 122 and an operating system 136. Security program 122 can include one or more security modules 124*a-c*, parameters 126, a dynamic link library 128, program functions 130, and a security program interface module 138. Each security module 124*a-c* may be a known or trusted security module and can include a memory page 132*a-c*. Operating system can include an operating system stack 118 and operating system functions 120. Security program interface module 138 can include a dispatch routing 140. A malicious device 114 can include malicious code 116. Malicious code 116 may be malware. Electronic device 110, malicious device 114, and security server 132 can be connected through network 112. In one example, malicious device 114 may be connected directly to electronic device 110 (e.g., through a Universal Serial Bus (USB) type connection).

Elements of FIG. 1 may be coupled to one another through one or more interfaces employing any suitable connections (wired or wireless), which provide viable pathways for network communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

In example embodiments, communication system 100 can be configured to help detect and prevent malicious calls (e.g., malicious Windows® asynchronous procedure calls (APC)) within electronic device 110. Electronic device 110 can be configured to continue proper operation (un-interrupted) when attacked by threats such as kernel-mode rootkits (e.g., ZeroAccess or Max++) which utilize a generic method to fight back against security products. In one example, security program interface module 138 can be configured to inspect KiUserApcDispatcher calls and ExitProcess calls. By specifically looking for call related events, security program interface module 138 can help mitigate against kernel-mode rootkit and other similar attacks and allow the execution of the target process, instead of terminating the process. This allows for better protection of security products from attacks, the ability to detect new attacks, the ability to gain better visibility to unknown threats, and to clean existing threats without the need of an external CDROM based boot.

For purposes of illustrating certain example techniques of communication system 100, it is important to understand the communications that may be traversing the network environment. The following foundational information may be viewed as a basis from which the present disclosure may be properly explained.

Increased access to the Internet has had the unintended effect of increasing the reach of software programs that capture personal information of users without their informed consent or that corrupt computers without the user's knowledge and informed consent. The term malware as used herein includes any type of software programs designed to infiltrate, modify, change, corrupt, or damage a computer system without the owner's informed consent, regardless of the motivation for the software program, and regardless of the results caused by the software program on the owner's devices, systems, networks, or data.

One type of malware includes a rapidly evolving family of kernel-mode rootkits that often infects a random system driver, overwriting its code with its own infected driver, and hijacking the storage driver chain in order to hide its presence on the disk. In a specific example, on an infected computer, the new driver sets up a device often called Devicesvchost.exe (or some other name), and stores a fake portable executable (PE) file called svchost.exe (or some other name) where the path is Devicesvchost.exesvchost.exe. The driver then attaches itself to the disk device stack and creates a new system process, called svchost.exe, pointing to the path: \GlobalrootDevicesvchost.exesvchost.exe. This fake process serves as a kind of trap, specifically looking for the types of file operations performed by security software.

When a typical security scanner tries to analyze the rootkit-created svchost.exe file, the rootkit queues an initialized APC into the scanner's own process, then calls the ExitProcess( ) function and forces the security scanner to terminate or stop a process such as a scan. Also, the malware can schedule malicious APC calls to execute malicious code from within the anti-virus or security process. This can, for example, be used for terminating the security process or performing malicious actions from within the security process.

Malware such as Max++ utilizes a malicious bait process technique by scheduling a malicious APC call, which will force the security process to terminate itself. Whenever access occurs to a malicious bait process, or to the device object of the malicious driver, the rootkit fights back by scheduling the malicious APC call. This way the malicious code does not have to attack the security product by name, or with specific targeted attacks. It will work against all of them, heuristically. As a result, Max++ rootkit and similar type malware can able disable security products including Rootkit scanner tools and security products.

User mode APC calls are executed in the context of a thread that belongs to a particular process such as the security executable process, or service. When a thread of the process is a certain wait state, the operating system checks if an APC is scheduled. Using the APC, the malware can hijack the execution of the thread to execute a new code at a specified address of the APC routine.

The malware code creates a new page in the process of the target and schedules the APC to the new page. The operating system will hijack a thread of the process in the right state and call the address specified by the APC routine. The APC routine of the malware looks for the function ExitProcess( ) and executes it. As a result, the product terminates before any protection of the system can happen and no scanning or detection will take place.

There are various other attack techniques used by malware to attack anti-virus or security processes. They revolve around directly attacking security processes by name (e.g., mcafee.exe, avp.exe) and often involve obtaining access by "opening" the process. There are some self-protection solutions which exist to handle such attack scenarios, such as by preventing access to AV-process using filters, but such solutions are not capable of thwarting the APC or kernel-mode rootkit based attack. Also since such APC based actions appear to be initiated by the security process itself, they cannot be blocked by trust based blockers. After all, the security software needs to trust its own actions.

A communication system to mitigate malicious calls, as outlined in FIG. 1 can resolve these issues (and others). In communication system 100 of FIG. 1, communication system 100 can be configured to focus on two approaches to address the problem described. In one embodiment the ExitProcess( ) function can be hooked, modified, or trapped by security program interface module 138 in the security program executables and dynamic link libraries (DLLs) to contain an extra routine. This routine (e.g., dispatch routine 140) can check if the ExitProcess( ) function was called from a page that does not belong to a known product. It does so by checking the return address on the stack above the ExitProcess( ) address and its stack parameter in operating system stack 118. Security program interface module 138 can verify if a context structure is available on operating system stack 118 (which is placed there by the operating system (OS) kernel in order to restore the context of the hijacked thread after the APC call by utilizing NtContinueAPI). Security program interface module 138 can do this by addressing operating system stack 118 from the ExitProcess( ), and see if +10 hexbytes (or some number) away, there is an address to an executable page which does not belong to the active process DLLs in memory and if there is no return address on operating system stack 119 that points back to security program 122 (which would be a legitimate call to ExitProcess( )). Security program interface module 138 can then push the right parameters on operating system stack 118 for an NtContinueAPI call for NTDLL, which will lead the OS kernel back to the restore context routines. This way, security program interface module 138 can prevent the termination of a process by malicious code.

In another embodiment, the function NTDLL!KiUserApcDispatcher is hooked. As used throughout, the term "hook", "hooked", "hooking", etc. includes to altering or augmenting the behavior of an operating system, application, module, or other components by intercepting function calls, messages, or events passed between the operating system, application, module, or components. By hooking this function, security program interface module 138 can inspect its input parameters (i.e., arguments) and verify which page will be executed as an APC routine and, in case the page is not part of loaded security program 122 products DLL, EXE, or the code where the APC is pointing to is clearly patched compared to the file image corresponding to the address in memory, security program interface module 138 can ignore the execution of the APCcall, and call the NtContinueAPI function instead with the right parameter, store the context of the hijack process thread, and continue proper execution. By allowing security program 122 to continue execution, security program interface module 138 can implement a proper scan for the root kit and clean it from the system. In addition, a heuristics message can be logged to the system log about the malicious APC call so unknown malware threats utilizing the technique can be detected with the approach. The heuristics message can be sent to security server 132 through network 112 where the malware can be analyzed.

Turning to the infrastructure of FIG. 1, communication system 100 in accordance with an example embodiment is shown. Generally, communication system 100 can be implemented in any type or topology of networks. Network 112 represents a series of points or nodes of interconnected communication paths for receiving and transmitting packets of information that propagate through communication system 100. Network 112 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

A packet is a unit of data that can be routed between a source node and a destination node on a packet switched network. A packet includes a source network address and a destination network address. These network addresses can be Internet Protocol (IP) addresses in a TCP/IP messaging protocol. The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, electronic device 110 and/or security server 132, may include software modules (e.g., security program interface module 138) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 110 and security server 132 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Figure 2:
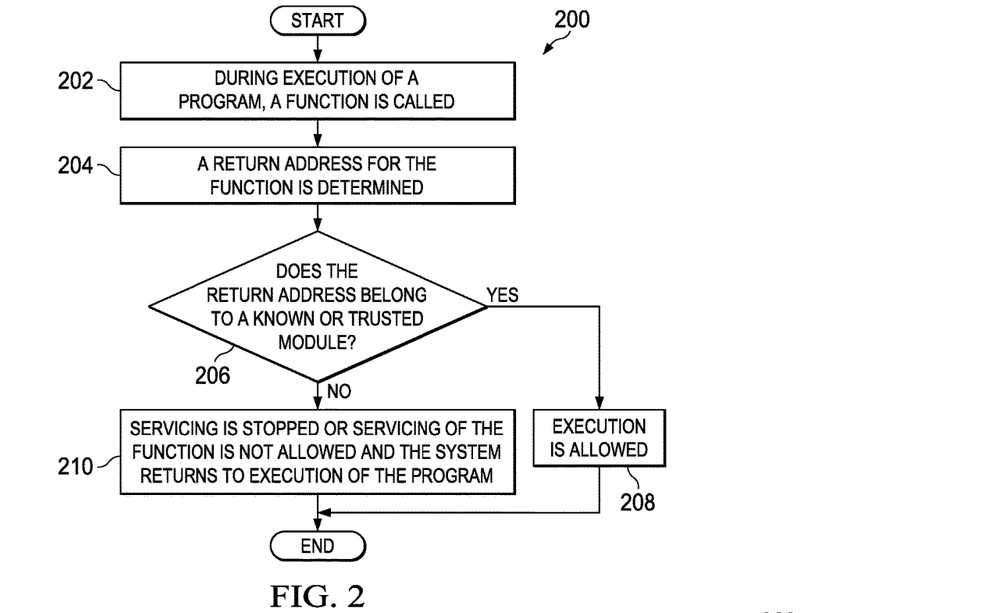
FIG. 2 is a simplified flowchart illustrating potential operations that may be associated with the communication system in accordance with an embodiment.

Turning to FIG. 2, FIG. 2 is an example flowchart illustrating possible operations of a flow 200 that may be associated with security program interface module 138, in accordance with an embodiment. At 202, during execution of a program (e.g., security program 122), a function is called. At 204, a return address for the function is determined. At 206, the system determines if the return address belongs to a known or trusted module (e.g., security module 124a). If the system determines that the return address belongs to a known or trusted module, then execution of the function is allowed, as in 208. If the system determines that the return address does not belong to a known or trusted module, then system will stop servicing or will not allow servicing of the function and the system will return to execution of the program, as in 210.

Figure 3:
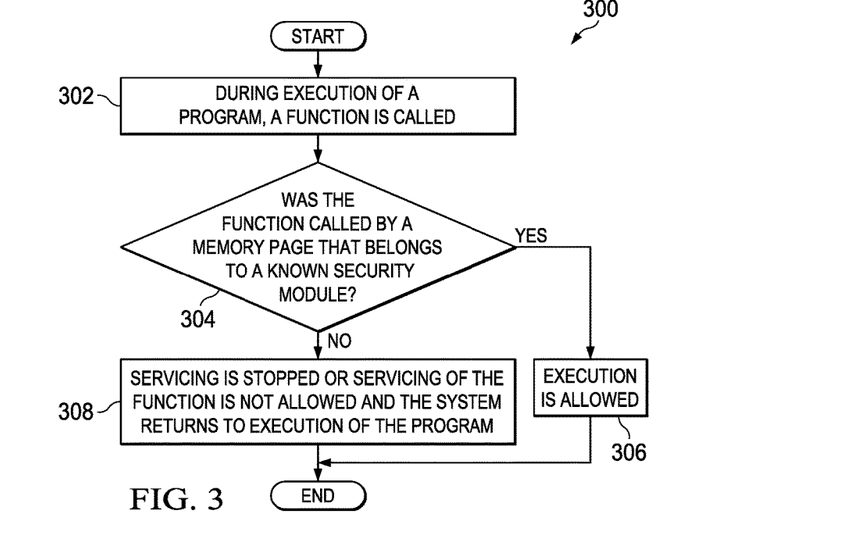
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with security program interface module 138, in accordance with an embodiment. At 302, during execution of a program (e.g., security program 122), a function is called. At 304, the system determines if the function was called by a memory page that belongs to a known security module (e.g., memory page 132a of security module 124a). If the function was called by a memory page that does belong to a known security module, then execution of the function is allowed, as in 306. If the function was called by a memory page that does not belong to a known security module, then the system will stop servicing or will not allow servicing of the function and the system will return to execution of the program, as in 308.

Figure 4:
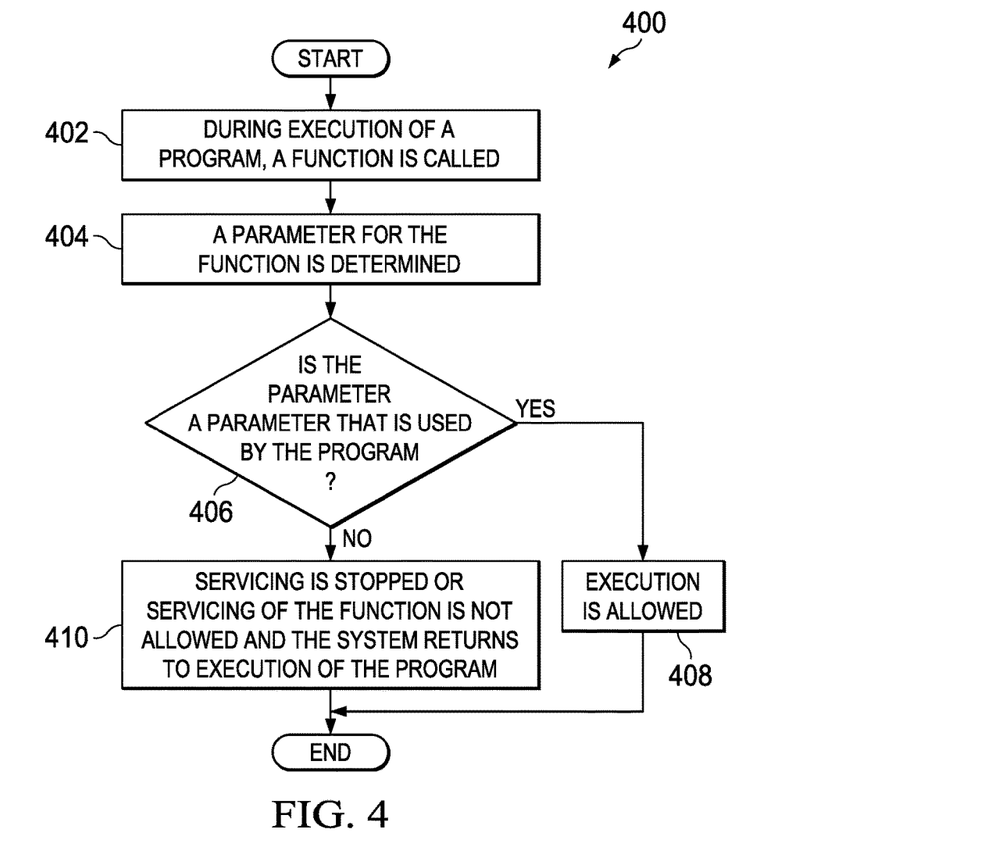
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with security program interface module 138, in accordance with an embodiment. At 402, during execution of a program, a function is called. For example, a security program may call an exit process function. At 404, a parameter for the function is determined. At 406, the system determines if the parameter is a parameter that is used by the program. For example, an exit code can be used as a parameter for an exit process function used by the security program and the security program will know what exit code it uses and will be able to identify if the correct one was used. If the parameter is a parameter that is used by the program, then execution of the function is allowed, as in 408. If the parameter is not a parameter that is used by the program, then the system will stop servicing or will not allow servicing of the function and the system will return to execution of the program, as in 410.

Figure 5:
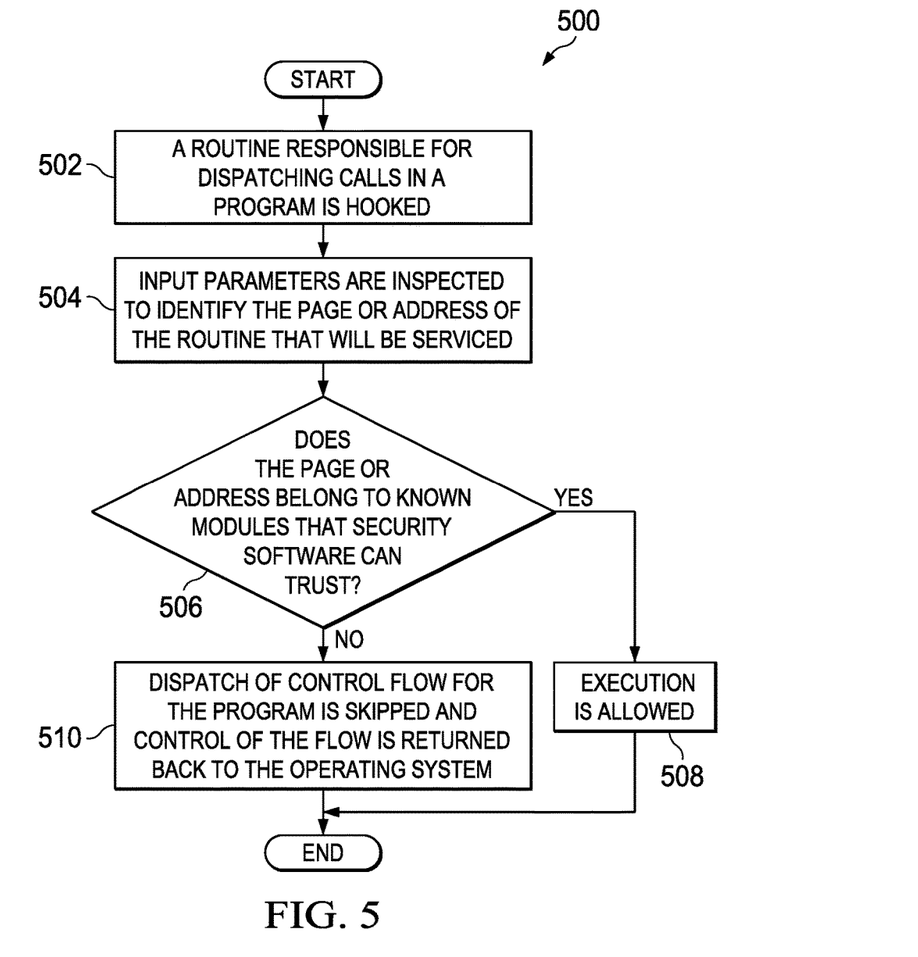
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with security program interface module 138, in accordance with an embodiment. At 502, a routine (e.g., dispatch routine 140) responsible for dispatching calls (e.g., APC calls) in a program is hooked. At 504, input parameters are inspected to identify the page or address of the routine that will be serviced. At 506, the system determines if the page or address belongs to known modules that security software can trust (e.g. memory page 132*a* in trusted security module 132*a*). If the page or address does belong to known modules that the security software can trust, then execution of the call is allowed, as in 508. If the page or address does not belong to known modules that the security software can trust, then dispatch of control flow for the program is skipped and control of the flow is returned back to the operating system, as in 510.

Figure 6:
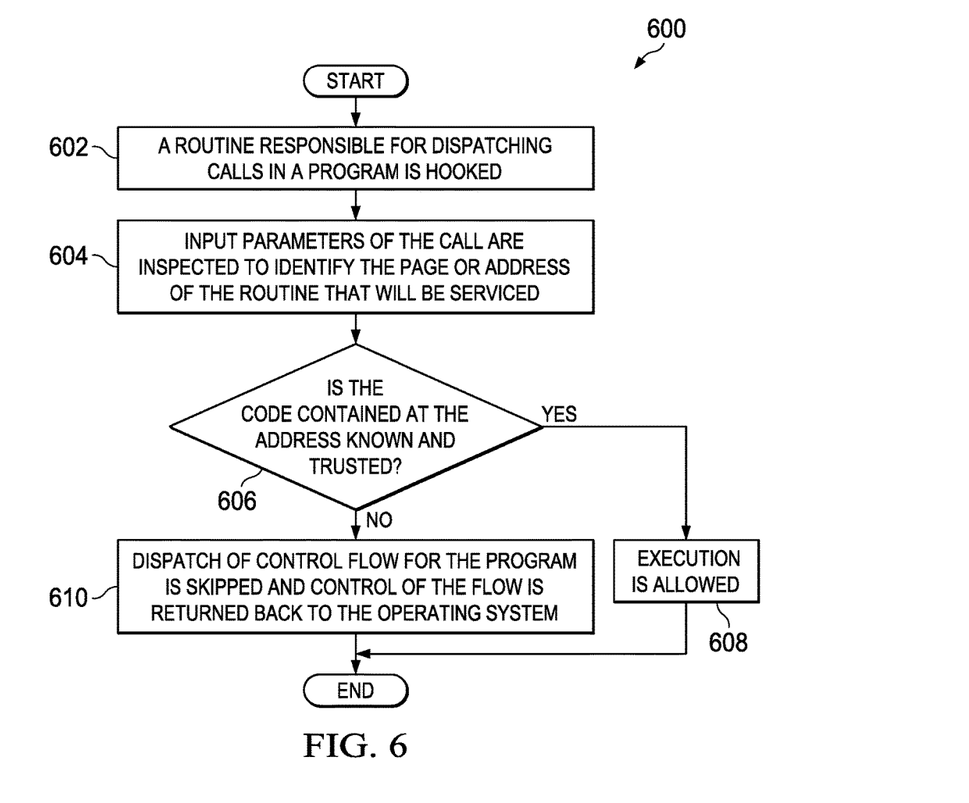
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with security program interface module 138, in accordance with an embodiment. At 602, a routine responsible for dispatching calls in a program is hooked (e.g., dispatch routine 140). At 604, input parameters of the call are inspected to identify the page or address of the routine that will be serviced. At 606, the system determines if the code contained at the address is known and trusted. If the code contained at the address is known and trusted, then execution of the call is allowed, as in 608. If the code contained at the address is not known or trusted, then dispatch of control flow for the program is skipped and control of the flow is returned back to the operating system, as in 610.

Figure 7:
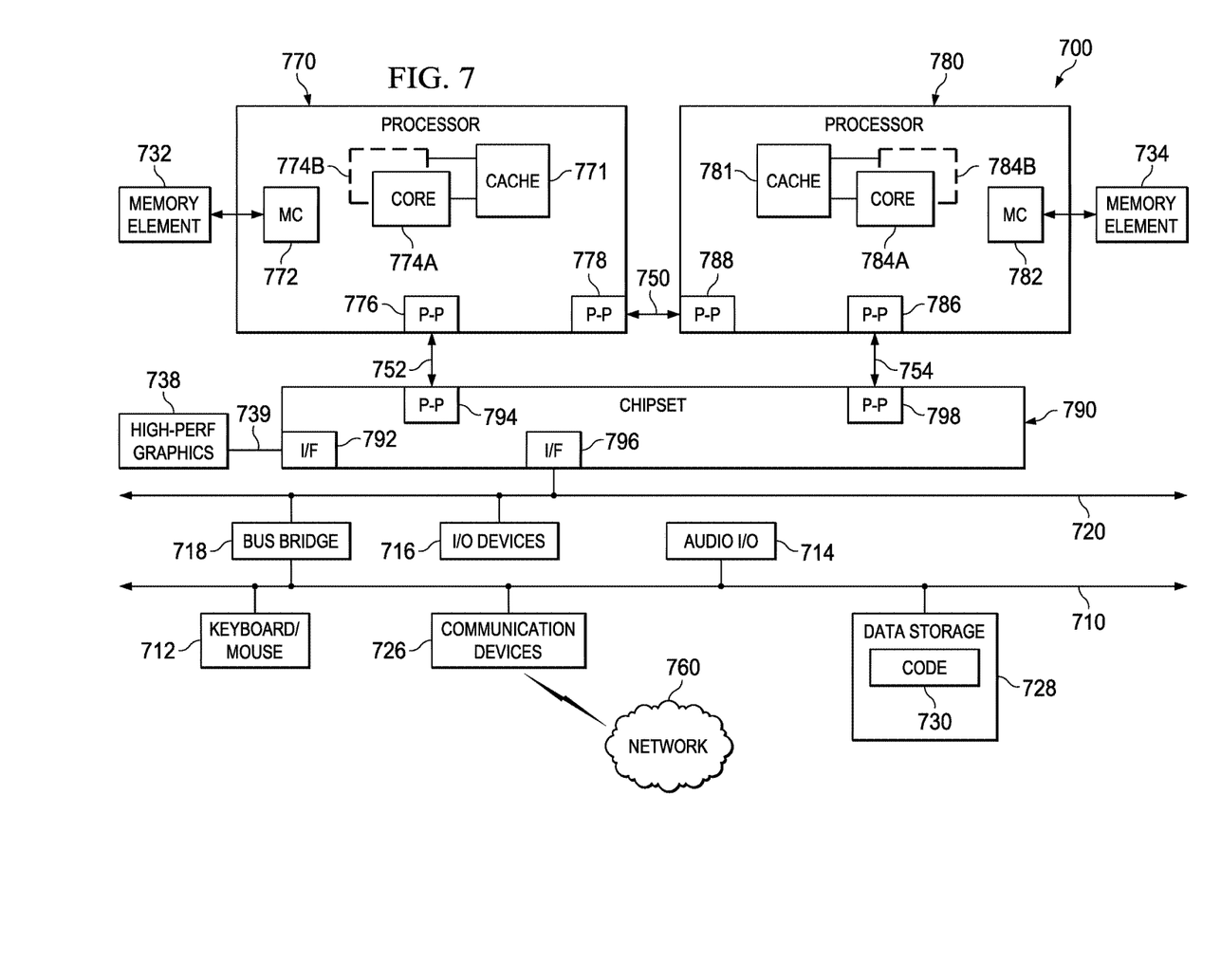
FIG. 7 is a block diagram illustrating an example computing system that is arranged in a point-to-point configuration in accordance with an embodiment.

FIG. 7 illustrates a computing system 700 that is arranged in a point-to-point (PtP) configuration according to an embodiment. In particular, FIG. 7 shows a system where processors, memory, and input/output devices are interconnected by a number of point-to-point interfaces. Generally, one or more of the network elements of communication system 100 may be configured in the same or similar manner as computing system 700.

As illustrated in FIG. 7, system 700 may include several processors, of which only two, processors 770 and 780, are shown for clarity. While two processors 770 and 780 are shown, it is to be understood that an embodiment of system 700 may also include only one such processor. Processors 770 and 780 may each include a set of cores (i.e., processor cores 774A and 774B and processor cores 784A and 784B) to execute multiple threads of a program. The cores may be configured to execute instruction code in a manner similar to that discussed above with reference to FIGS. 2-6. Each processor 770, 780 may include at least one shared cache 771, 781. Shared caches 771, 781 may store data (e.g., instructions) that are utilized by one or more components of processors 770, 780, such as processor cores 774 and 784.

Processors 770 and 780 may also each include integrated memory controller logic (MC) 772 and 782 to communicate with memory elements 732 and 734. Memory elements 732 and/or 734 may store various data used by processors 770 and 780. In alternative embodiments, memory controller logic 772 and 782 may be discreet logic separate from processors 770 and 780.

Processors 770 and 780 may be any type of processor, and may exchange data via a point-to-point (PtP) interface 750 using point-to-point interface circuits 778 and 788, respectively. Processors 770 and 780 may each exchange data with a chipset 790 via individual point-to-point interfaces 752 and 754 using point-to-point interface circuits 776, 786, 794, and 798. Chipset 790 may also exchange data with a high-performance graphics circuit 738 via a high-performance graphics interface 739, using an interface circuit 792, which could be a PtP interface circuit. In alternative embodiments, any or all of the PtP links illustrated in FIG. 7 could be implemented as a multi-drop bus rather than a PtP link.

Chipset 790 may be in communication with a bus 720 via an interface circuit 796. Bus 720 may have one or more devices that communicate over it, such as a bus bridge 718 and I/O devices 716. Via a bus 710, bus bridge 718 may be in communication with other devices such as a keyboard/mouse 712 (or other input devices such as a touch screen, trackball, etc.), communication devices 726 (such as modems, network interface devices, or other types of communication devices that may communicate through a computer network 760), audio I/O devices 714, and/or a data storage device 728. Data storage device 728 may store code 730, which may be executed by processors 770 and/or 780. In alternative embodiments, any portions of the bus architectures could be implemented with one or more PtP links.

The computer system depicted in FIG. 7 is a schematic illustration of an embodiment of a computing system that may be utilized to implement various embodiments discussed herein. It will be appreciated that various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 8:
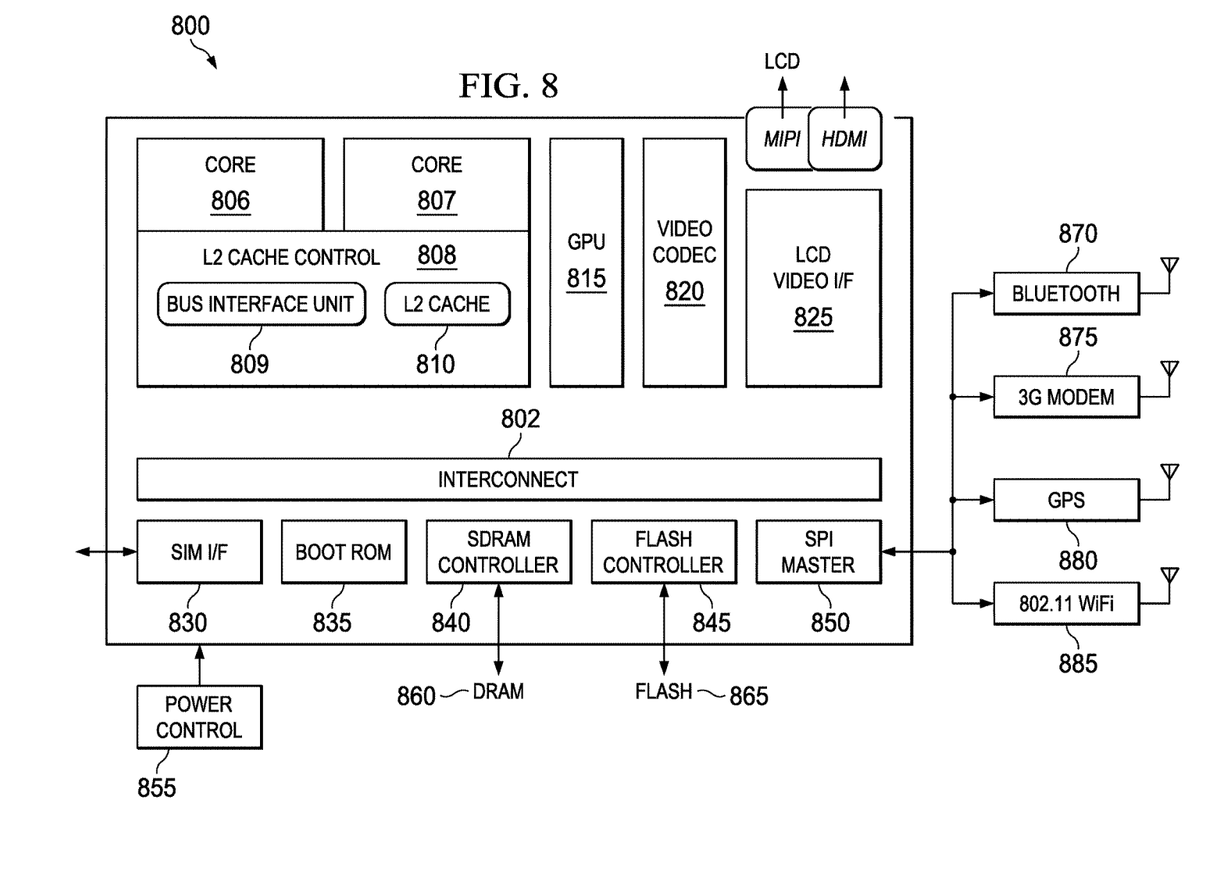
FIG. 8 is a simplified block diagram associated with an example ARM ecosystem system on chip (SOC) of the present disclosure.

Turning to FIG. 8, FIG. 8 is a simplified block diagram associated with an example ARM ecosystem SOC 800 of the present disclosure. At least one example implementation of the present disclosure can include the mitigation of malicious calls features discussed herein and an ARM component. For example, the example of FIG. 8 can be associated with any ARM core (e.g., A-9, A-15, etc.). Further, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 8, ARM ecosystem SOC 800 may include multiple cores 806-807, an L2 cache control 808, a bus interface unit 809, an L2 cache 810, a graphics processing unit (GPU) 815, an interconnect 802, a video codec 820, and a liquid crystal display (LCD) I/F 825, which may be associated with mobile industry processor interface (MIPI)/high-definition multimedia interface (HDMI) links that couple to an LCD.

ARM ecosystem SOC 800 may also include a subscriber identity module (SIM) I/F 830, a boot read-only memory (ROM) 835, a synchronous dynamic random access memory (SDRAM) controller 840, a flash controller 845, a serial peripheral interface (SPI) master 850, a suitable power control 855, a dynamic RAM (DRAM) 860, and flash 865. In addition, one or more example embodiment include one or more communication capabilities, interfaces, and features such as instances of Bluetooth™ 870, a 3G modem 875, a global positioning system (GPS) 880, and an 802.11 Wi-Fi 885.

In operation, the example of FIG. 8 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 9:
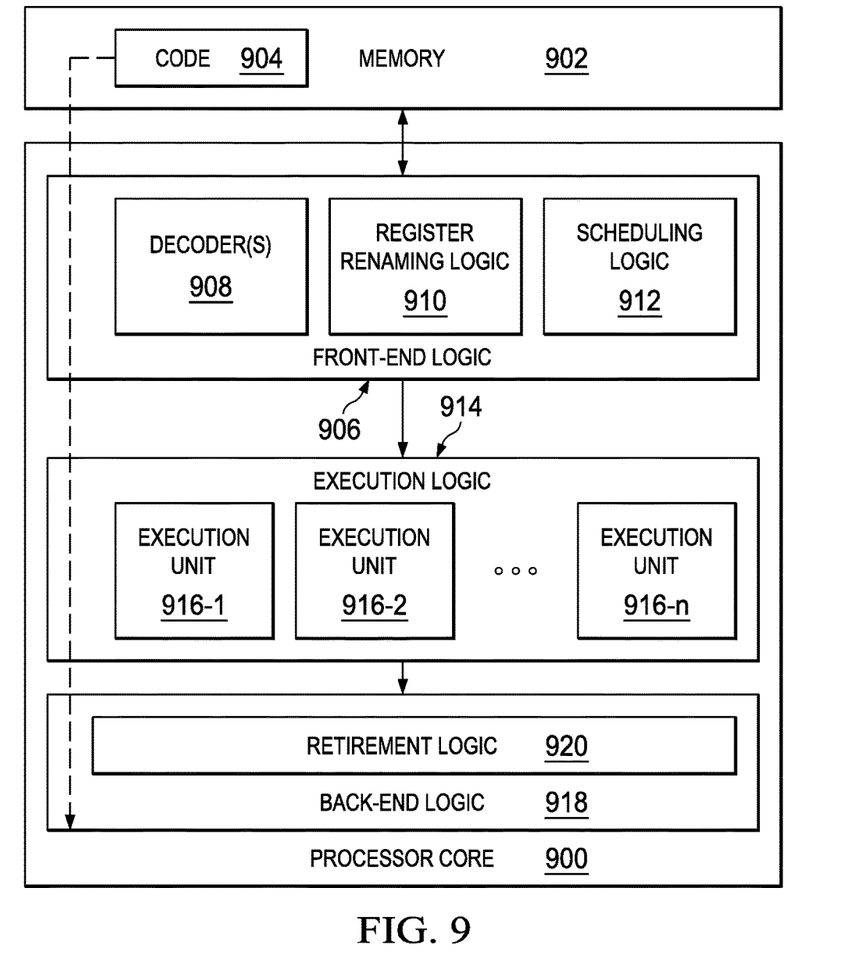
FIG. 9 is a block diagram illustrating an example processor core in accordance with an embodiment.

FIG. 9 illustrates a processor core 900 according to an embodiment. Processor core 9 may be the core for any type of processor, such as a micro-processor, an embedded processor, a digital signal processor (DSP), a network processor, or other device to execute code. Although only one processor core 900 is illustrated in FIG. 9, a processor may alternatively include more than one of the processor core 900 illustrated in FIG. 9. For example, processor core 900 represents one example embodiment of processors cores 774a, 774b, 784a, and 784b shown and described with reference to processors 770 and 780 of FIG. 7. Processor core 900 may be a single-threaded core or, for at least one embodiment, processor core 900 may be multithreaded in that it may include more than one hardware thread context (or "logical processor") per core.

FIG. 9 also illustrates a memory 902 coupled to processor core 900 in accordance with an embodiment. Memory 902 may be any of a wide variety of memories (including various layers of memory hierarchy) as are known or otherwise available to those of skill in the art. Memory 902 may include code 904, which may be one or more instructions, to be executed by processor core 900. Processor core 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor core 900 can also include execution logic 914 having a set of execution units 916-1 through 916-N. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor core 900 allows out of order execution but requires in order retirement of instructions. Retirement logic 920 may take a variety of known forms (e.g., re-order buffers or the like). In this manner, processor core 900 is transformed during execution of code 904, at least in terms of the output generated by the decoder, hardware registers and tables utilized by register renaming logic 910, and any registers (not shown) modified by execution logic 914.

Although not illustrated in FIG. 9, a processor may include other elements on a chip with processor core 900, at least some of which were shown and described herein with reference to FIG. 7. For example, as shown in FIG. 7, a processor may include memory control logic along with processor core 900. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 2-6) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims;

and (b) does not intend, by any statement in the specification, to limit this disclosure in any way that is not otherwise reflected in the appended claims.

OTHER NOTES AND EXAMPLES

Example C1 is at least one machine readable storage medium having one or more instructions that, when executed by a processor, cause the processor to receive a function call, determine the return address for the function call, and block the function call if the return address does not belong to a trusted module.

In Example C2, the subject matter of Example C1 can optionally include where the instructions, when executed by the processor, further cause the processor to allow the function call if the return address does belong to the trusted module.

In Example C3, the subject matter of any one of Examples C1-C2 can optionally include where the instructions, when executed by the processor, further cause the processor to determine the location of a memory page that initiated the function call, determine if the memory page is associated with a trusted module, and block the function call if the memory page is not associated with the trusted module.

In Example C4, the subject matter of any one of Examples C1-C3 can optionally include where the instructions, when executed by the processor, further cause the processor to allow the function call if the memory page is associated with the trusted module.

In Example C5, the subject matter of any one of Examples C1-C4 can optionally include where the instructions, when executed by the processor, further cause the processor to determine a parameter for the function call, determine if the parameter is a known parameter used by the process that called the function, and block the function call if the parameter is not the known parameter used by the process that called the function.

In Example C6, the subject matter of any one of Example C1-C5 can optionally include where the instructions, when executed by the processor, further cause the processor to allow the function call if the parameter is the known parameter used by the process that called the function.

In Example C7, the subject matter of any one of Examples C1-C6 can optionally include where the function is called by a security system.

In Example C8, the subject matter of any one of Examples A1-C7 can optionally include where the trusted module is part of the security system.

In Example A1, an apparatus can include a security program interface module configured to receive a function call, determine the location of a memory page that initiated the function call, determine if the memory page is associated with the trusted module, and block the function call if the memory page is not associated with the trusted module.

In Example, A2, the subject matter of Example A1 can optionally include where the function call is allowed if the memory page is associated with the trusted module.

In Example A3, the subject matter of any one of Examples A1-A2 can optionally include where the return address is determined for the function call and the function call is blocked if the return address does not belong to a trusted module.

In Example A4, the subject matter of any one of Examples A1-A3 can optionally include where the function call is allowed if the return address does belong to the trusted module.

In Example A5, the subject matter of any one of Examples A1-A4 can optionally include where a parameter for the function call is determined and the function is blocked if the parameter is not a known parameter used by the process that called the function.

In Example A6, the subject matter of any one of Examples A1-A5 can optionally include where the function call is allowed if the parameter is the known parameter used by the process that called the function.

In Example A7, the subject matter of any one of Examples A1-A6 can optionally include where the function is called by a security system.

In Example A8, the subject matter of any one of the Examples A1-A7 can optionally include where the trusted module is part of the security system.

Example M1 is a method including receiving a function call, determining a parameter for the function call, determining if the parameter is a known parameter used by the process that called the function, and blocking the function call if the parameter is not the known parameter used by the process that called the function.

In Example M2, the subject matter of Example M1 can optionally include allowing the function call if the parameter is the known parameter used by the process that called the function.

In Example M3, the subject matter of any one of the Examples M1-M2 can optionally include determining the return address for the function call and blocking the function call if the return address does not belong to a trusted module.

In Example M4, the subject matter of any one of the Examples M1-M3 can optionally include allowing the function call if the return address does belong to the trusted module.

In Example M5, the subject matter of any one of the Examples M1-M4 can optionally include determining the location of a memory page that initiated the function call, determining if the memory page is associated with the trusted module, and blocking the function call if the memory page is not associated with the trusted module.

In Example M6, the subject matter of any one of the Examples M1-M5 can optionally include allowing the function call if the memory page is associated with the trusted module.

In Example M7, the subject matter of any one of the Examples M1-M6 can optionally include where the function is called by a security system.

In Example M8, the subject matter of any one of the Examples M1-M7 can optionally include where the trusted module is part of the security system Example S1 is a system for mitigating malicious calls, the system can include a security program interface module configured for receiving a function call, determining the return address for the function call, and blocking the function call if the return address does not belong to a trusted module.

Example X1 is a machine-readable storage medium including machine-readable instructions to implement a method or realize an apparatus as in any one of the Examples A1-A8, or M1-M8. Example Y1 is an apparatus comprising means for performing of any of the Example methods M1-M8. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory, computer-readable medium comprising one or more instructions that, when executed by a processor, cause the processor to execute a method comprising:
   hooking a user mode asynchronous procedure call (APC) dispatcher function of a dynamic-link library;
   inspecting, by a module of a predetermined program, a parameter of the APC dispatcher function, and verifying a page that would be executed as an APC routine;
   ignoring an execution of the APC, if the page is not a part of the predetermined program; and
   calling an application programming interface function to continue an execution of the predetermined program, if the page is not a part of the predetermined program, wherein the execution of the predetermined program includes implementing a scan for a root kit and cleaning the root kit from a system.

2. The at least one computer-readable medium of claim 1, wherein the ignoring and calling are performed, if the page is not part of a dynamic-link library of the predetermined program or part of an executable of the predetermined program, or the APC points to code that differs from a file image corresponding to an address in memory.

3. The at least one computer-readable medium of claim 1, wherein the APC dispatcher function is KiUserApcDispatcher.

4. The at least one computer-readable medium of claim 1, wherein the application programming interface function is NtContinue.

5. The at least one computer-readable medium of claim 1, the method further comprising:
   logging a heuristics message to a system log about the APC.

6. The at least one computer-readable medium of claim 5, the method further comprising:
   sending the heuristics message to a server through a network.

7. A method, comprising:
   hooking a user mode asynchronous procedure call (APC) dispatcher function of a dynamic-link library;
   inspecting, by a processor chip executing a module of a predetermined program, a parameter of the APC dispatcher function, and verifying a page that would be executed as an APC routine;
   ignoring an execution of the APC, if the page is not part of the predetermined program; and
   calling an application programming interface function to continue an execution of the predetermined program, if the page is not a part of the predetermined program, wherein the execution of the predetermined program includes implementing a scan for a root kit and cleaning the root kit from a system.

8. The method of claim 7, wherein the ignoring and calling are performed, if the page is not part of a dynamic-link library of the predetermined program or part of an executable of the predetermined program, or the APC points to code that differs from a file image corresponding to an address in memory.

9. The method of claim 7, wherein the APC dispatcher function is KiUserApcDispatcher.

10. The method of claim 7, wherein the application programming interface function is NtContinue.

11. The method of claim 7, further comprising:
    logging a heuristics message to a system log about the APC.

12. An apparatus, comprising:
    a processor chip configured to hook a user mode asynchronous procedure call (APC) dispatcher function of a dynamic-link library, to inspect, with a module of a predetermined program, a parameter of the APC dispatcher function, and to verify a page that would be executed as an APC routine, wherein
    the processor chip is further configured to ignore an execution of the APC, if the page is not a part of the predetermined program, and to call an application programming interface function to continue an execution of the predetermined program, if the page is not a part of the predetermined program, and the execution of the predetermined program includes implementing a scan for a root kit and cleaning the root kit from a system.

13. The apparatus of claim 12, wherein the processor chip is further configured to ignore the execution of the APC and call the application programming interface function, if the page is not part of a dynamic-link library of the predetermined program or part of an executable of the predetermined program, or the APC points to code that differs from a file image corresponding to an address in memory.

14. The apparatus of claim 12, wherein the APC dispatcher function is KiUserApcDispatcher.

15. The apparatus of claim 12, wherein the application programming interface function is NtContinue.

16. The apparatus of claim 12, wherein the processor chip is further configured to log a heuristics message to a system log about the APC.

17. The apparatus of claim 16, wherein the apparatus is configured to send the heuristics message to a server through a network.

* * * * *

UNITED STATES PATENT AND TRADEMARK OFFICE
CERTIFICATE OF CORRECTION

PATENT NO. : 10,204,223 B2
APPLICATION NO. : 15/708003
DATED : February 12, 2019
INVENTOR(S) : Peter Szor et al.

Page 1 of 1

It is certified that error appears in the above-identified patent and that said Letters Patent is hereby corrected as shown below:

On the Title Page

Item (72), "Inventors", Line 2, delete "Hilsboro, OR" and insert -- Hillsboro, OR --, therefor Signed and Sealed this
Ninth Day of April, 2019

Andrei Iancu
*Director of the United States Patent and Trademark Office*